Dec. 15, 1953 L. H. METZGER 2,662,519
DIAMOND DRESSING TOOL
Filed March 14, 1951
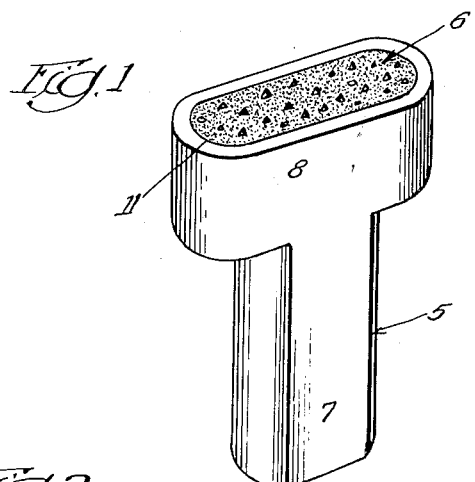
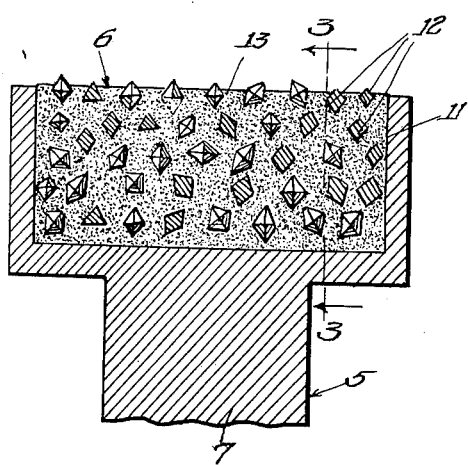
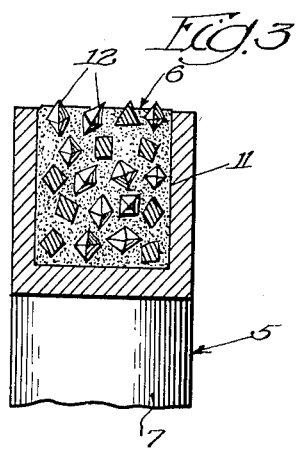
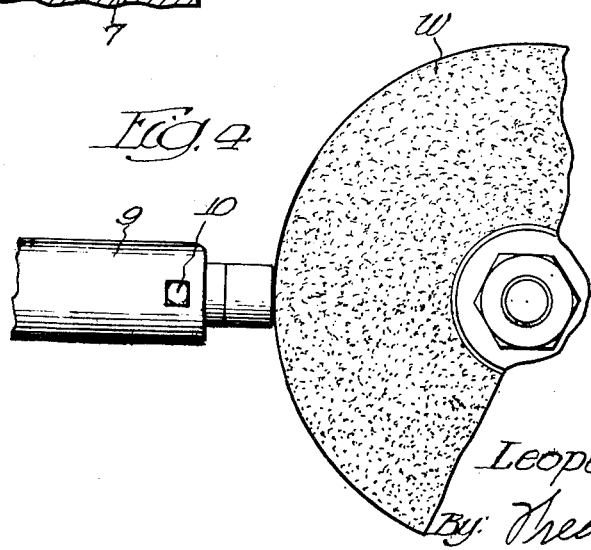
Inventor
Leopold H Metzger
By: Fred Gerlach
Atty Patented Dec. 15, 1953

2,662,519

UNITED STATES PATENT OFFICE 2,662,519

DIAMOND DRESSING TOOL

Leopold H. Metzger, Chicago, Ill., assignor to Super-Cut, Inc., Chicago, Ill.

Application March 14, 1951, Serial No. 215,497

2 Claims. (Cl. 125—39)

The present invention relates generally to dressing tools. More particularly the invention relates to that type of dressing tool which serves in connection with use to dress and true the periphery of a grinding wheel for precision grinding, embodies a shank having one end thereof adapted for connection to a holder which supports the tool as a whole so that it is adjustable to and from the periphery of the grinding wheel and is also movable transversely of the wheel, also embodies a cutting part which is mounted on the other end of the shank and consists of naturally shaped diamonds and a metallic matrix therefor, and is used by moving it transversely of the grinding wheel after the outer portion of the cutting part is placed against the periphery of the wheel.

In a dressing tool of this type it has heretofore been proposed to use in connection with the cutting part a single large sized diamond of octahedral or dodecahedral shape, the weight of the diamond (frequently ½ to 5 carats) depending upon the mesh size of the grit of the grinding wheel and the hardness of the bonding material of the wheel. In practice it has been found that a dressing tool having but a single large sized diamond is subject to certain objections and disadvantages. In the first place the points of the diamond are only used in connection with precision dressing and hence the diamond must be re-set from time to time in order to present new sharp points and the diamond after wearing away of its points is useless. Secondly, if the tool is placed or held at the usual drag angle of from 10° to 25° it is necessary to rotate the diamond constantly so as to present new cutting edges to the periphery of the grinding wheel being dressed. In the third place, the use of a single diamond necessitates an extremely slow traverse across the periphery of the grinding wheel because if the tool is moved laterally too fast the single dressing point forms on the periphery of the wheel lines or grooves resembling a screw thread.

It has also been proposed in connection with a dressing tool of the type under consideration to use a plurality of natural diamonds that are larger in size than 70 diamonds per carat. Such a tool, although tending materially to reduce so called threading of the periphery of the grinding wheel being dressed, is subject to the objection that the diamonds, when worn to their girdles, lose their cutting effectiveness and present such a large combined cutting surface and such large individual cutting surfaces as to cause the periphery of the wheel to glaze, burn and "close up."

The principal object of this invention is the provision of a diamond dressing tool which is an improvement upon, and eliminates the disadvantages of, previous tools and is characterized by the fact that it possesses extremely high efficiency, requires in connection with use thereof no re-setting of diamonds, is capable of an extremely fast traverse of the periphery of the grinding wheel being dressed without producing threading of the periphery or causing the latter to glaze, burn or "close up," serves to effect precision dressing and truing of the wheel, has a comparatively long life and makes it possible to dress and true the wheel expeditiously and at a low labor cost. These characteristics or properties of the tool are attributable to three essential factors, namely, the particular size of the natural diamonds that are distributed heterogeneously but uniformly throughout the metallic matrix of the cutting part, the number of diamonds in the dressing surface of the cutting part and the degree of hardness of the metallic matrix in which the diamonds are distributed and held. In the present diamond dressing tool the size of the naturally shaped diamonds ranges between 70 per carat to 230 per carat, depending upon the speed of traverse of the tool and upon the mesh size of the grit and the type and hardness of the bond of the grinding wheel being dressed, the distribution of the diamonds is such that there are fewer diamonds when their size is large and more diamonds when their size is small and also such that when all of the diamonds are 70 per carat there are no less than 24 per square inch in the dressing surface and when all of the diamonds are 230 per carat there are no more than 300 per square inch in the dressing surface, and the hardness of the metallic matrix of the cutting part is no less than 65 on a Rockwell "B" scale or more than 62 on a Rockwell "C" scale. The particular size of the diamonds, the amount or distribution of the diamonds and the hardness of the metallic matrix are essentially critical factors and together constitute the reason why the present tool is both practical and efficient and has capabilities that are not inherent in previously designed diamond dressing tools.

A further object of the invention is to provide a diamond dressing tool which is generally of new and improved construction and is capable of being produced at a comparatively low cost.

Other objects of the invention and the various advantages and characteristics of the present dressing tool will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a diamond dressing tool embodying the invention;

Figures 2 and 3 are longitudinal sections taken at right angles to one another; and Figure 4 is a side elevation showing the tool in its dressing position with respect to a grinding wheel to be dressed and trued.

The dressing tool that is shown in the drawing constitutes the preferred form or embodiment of the invention. It is designed primarily as a medium or instrumentality for dressing the periphery or grinding surface of a grinding wheel $w$, and consists of a shank 5 and a block-like cutting part 6.

The shank 5 is formed of steel or any other suitable metal. It is preferably T-shaped and consists of an elongated piece 7 and a crosspiece 8 at one end of the piece 7. The elongated piece 7 of the shank has flat parallel side surfaces and convex end surfaces and is adapted to fit within a conventional tubular tool holder 9 and be retained in place by a set screw 10. As well understood in the art, the holder 9 serves to support the dressing tool so that it is adjustable to and from the periphery of the grinding wheel to be dressed and is also movable transversely of the wheel in order to cause the cutting part of the tool to traverse the periphery of the grinding wheel. The crosspiece 8 of the shank has flat parallel side surfaces and convex end surfaces. The side surfaces of the crosspiece are flush with the side surfaces of the piece 7 and the convex end surfaces of the crosspiece are disposed equidistantly from the axis or longitudinal center line of the shank. The front surface of the crosspiece is flat and extends at right angles to the flat parallel side surfaces. It is contemplated that the shank will be so mounted with respect to the holder 9 that the crosspiece 8 will extend in true parallel relation with the axis of the grinding wheel $w$ and that the front surface of the crosspiece when moved into engagement with the periphery of the wheel, will extend tangentially with respect to said periphery, as shown in Figure 4. An elongated longitudinally extending socket 11 is formed in the crosspiece 8 of the shank 5. This socket has the cutting part 6 mounted within it as hereinafter described and intersects and opens onto the flat front surface of the shank crosspiece 8. The sides of the socket are preferably flat and parallel and the ends of the socket are preferably semi-circular in cross section. As shown in Figures 2 and 3, the socket 11 is approximately four-fifths as deep as the crosspiece 8 of the shank.

The cutting part 6 of the dressing tool is disposed within, and shaped conformably to, the socket 11 in the shank crosspiece 8 and consists of a plurality of diamonds 12 and a metallic matrix 13. The diamonds of the cutting part are disposed heterogeneously but uniformly throughout the matrix. The exposed surface of the cutting part constitutes the dressing surface of the tool and is substantially flush with the flat front surface of the crosspiece 8 of the shank 5. The diamonds 12 of the cutting part are hard, fine quality, naturally formed, solid diamonds as contradistinguished from diamond fragments or chips which generally have flaws, cracks, imperfections and relatively soft portions. They are generally octahedral or dodecahedral in shape and constitute the dressing and truing portion of the cutting part. It is essential that the diamonds 12 of the cutting part will be of no greater size than 70 per carat and no smaller size than 230 per carat. It has been found that if the size of the diamonds is greater than 70 per carat or smaller than 230 per carat satisfactory or optimum results are not obtainable. The particular size of the diamonds is determined by the mesh size of the grit and the type and hardness of the bond of the grinding wheel to be dressed and trued. It is contemplated that the diamonds may be sized by correct sieving. For example, holes may be drilled in thin circular sheets of metal with drills having the diameters set forth below. The sheets or sieves are placed one at a time across the central portion of the interior of a vertically extending cylinder having a closed top and a closed bottom. The diamonds to be sized are placed on the particular sieve within the cylinder and the cylinder is agitated until all of the diamonds that are capable of passing through the drilled holes pass through the sieve onto the closed bottom of the cylinder. The same procedure is followed with all of the other sieves and in this way the particular size of the diamonds is determined.

| Diamonds passing through sieve with holes made by drill diameter below— | Diamonds remaining on top of sieve with holes made by drill diameter below— | Diamonds per carat approximately— |
|---|---|---|
| Inches | Inches | |
| .058 | .054 | 70 |
| .054 | .050 | 80 |
| .050 | .046 | 90 |
| .046 | .042 | 130 |
| .042 | .038 | 170 |
| .038 | .035 | 230 |

In practice it has been found that if the size of the diamonds 12 is 70 to 90 per carat the cutting part will effectively and efficiently dress and true a grinding wheel having grit of from 24 to 60 mesh and a median hard vitrified bond; that if the size of the diamonds is 130 to 170 per carat the cutting part will effectively and efficiently dress and true a grinding wheel having grit of from 70 to 120 mesh and a medium hard vitrified bond; and that if the size of the diamonds is 230 per carat the cutting part of the tool will efficaciously dress and true a grinding wheel having grit of finer than 120 mesh and a medium hard vitrified bond. By having the size of the diamonds 12 no more than 70 per carat there is no likelihood of the exposed diamonds, when worn to their girdles, glazing, burning or "closing up" the periphery of the grinding wheel in connection with use of the dressing tool. The number of diamonds that are disposed heterogeneously but uniformly throughout the matrix 13 of the cutting part 6 is such that there are fewer diamonds when their size is large and more diamonds when their size is small and also such that when all of the diamonds are 70 per carat there are no less than 24 per square inch in the dressing surface and when all of the diamonds are 230 per carat there are no more than 300 per square inch in the dressing surface. It is to be understood that when the size of the diamonds is anywhere between 70 to 230 per carat the number of diamonds in the exposed dressing surface will be in proportion to the number of diamonds heretofore mentioned. By having such a predetermined number of diamonds in the exposed dressing surface of the cutting part the leading diamonds in the direction of traverse of the tool do the rough dressing and the following diamonds, i. e., the diamonds in the trailing portion of the dressing surface, do the corrective work and provide the desired precision dressing and truing of the periphery of the grinding wheel even though the leading diamonds may have "faded" or become worn due to the roughness of their particular work. As heretofore pointed out if the size of the diamonds is, for example, 70 per carat there will be in the exposed dressing surface no less than 24 diamonds per square inch and that if the size of the diamonds is 230 per carat there will be in the exposed dressing surface no more than 300 diamonds per square inch. If there are too few diamonds in the exposed dressing surface of the cutting part the exposed diamonds are called upon to do too much work and wear or "fade" too rapidly. If there are too many diamonds in the exposed dressing surface the exposed diamonds, especially when worn to their girdles, present too great a combined cutting surface and hence result in glazing, burning and "closing up" of the periphery of the grinding wheel being dressed and trued. Computation of the number of diamonds within the cutting part to give the desired number of exposed diamonds in the dressing surface within the range heretofore mentioned may be arrived at by giving consideration and evaluation to the following factors: (1) desired number of exposed diamonds in the dressing surface of the tool, (2) square inch area of the tool's dressing surface, (3) depth of the cutting part 6, and (4) size of diamonds. As an example or illustration of computation let it be assumed that the cutting part 6 has an average length of .750 inch, a width of .250 inch and a depth of .400 inch and it is desired to use diamonds of a size of 70 per carat and to provide in the dressing surface 27 diamonds per square inch. The volume of the cutting part is .075 cubic inch and the dressing surface is .1875 square inch. On the basis of the dressing surface being .1875 square inch there would be approximately five diamonds in such surface. Theoretically there would be a layer of diamonds every .056 inch. Since the depth of the cutting part is .400 inch there would be 7.15 layers of diamonds making a total of 36 diamonds to be used in the cutting part. Similarly, if it is desired to present 200 diamonds per square inch of dressing surface and the diamond size is 170 per carat there would be a layer of diamonds approximately every .040 inch, making ten layers of diamonds in all, each containing 37 diamonds. On this basis there would be needed 370 diamonds throughout the matrix of the cutting part in order to provide the desired number of exposed diamonds on the dressing surface.

The matrix 13 of the cutting part serves securely to hold the diamonds in place. It is formed of fused or sintered comminuted metal and has a hardness of no less than 65 on a Rockwell "B" scale and no more than 62 on a Rockwell "C" scale. The hardness of the matrix is an important factor from the standpoint of the matrix effectively and efficiently holding the diamonds in place. If the hardness of the matrix is lower than 65 on a Rockwell "B" scale the matrix is so soft that it permits the exposed diamonds in the dressing surface of the cutting part to drop out or become dislodged prematurely. On the other hand, if the hardness of the matrix is in excess of 62 on a Rockwell "C" scale the matrix is so hard that it is seldom worn away fast enough by the grinding wheel to permit the diamonds to protrude so as to accomplish the desired dressing and truing. Instead, the metallic matrix itself rubs against the periphery of the wheel and results in glazing, burning or "closing up" of the pores of the wheel. Within the heretofore mentioned range of hardness are numerous effective metal compounds which may be effectively and efficiently used to form the matrix when consideration is given to the hardness and porosity of the grinding wheel, the mesh size of the grinding wheel grit, the size of the diamonds, the speed of traverse of the tools and the positioning of the diamonds with respect to one another. In forming the cutting part 6 the diamonds of selected size and in proper amount are thoroughly mixed with the proper amount of matrix forming material in comminuted or powdered form. The mixing may be accomplished by tumbling to such an extent that the resultant mixture has the diamonds uniformly distributed throughout the matrix forming material. After the mixing operation the mixture in the form of matrix forming material and diamonds, is placed in a suitable mold. Thereafter the mixture is subjected to such heat and pressure in a non-oxidizing atmosphere as to produce a dense and solid or non-porous compact having the same shape as the socket 11 in the crosspiece 8 of the shank 5. After formation of the compact, i. e., the cutting part 6, the socket 11 is cleaned and fluxed. At the conclusion of this the compact is inserted into the socket and is brazed in place by use of any conventional silver solder and proper heating.

The following is a matrix formula which has been found in practice to be satisfactory:

| | Per cent by weight |
|---|---|
| Copper | 52.08 |
| Nickel | 42.62 |
| Iron | .32 |
| Carbon | .21 |
| Powdered dry flux | 4.77 |

This formula, when heated to 1225° F. and molded under pressure of approximately 60,000 pounds per square inch, produces a matrix having a Rockwell hardness of 78 to 80 on a "B" scale. The powdered dry flux of the formula may, if desired, be tetraborate.

Another satisfactory matrix formula is the following:

| | Per cent by weight |
|---|---|
| Copper | 60.54 |
| Tin | 1.69 |
| Antimony | .18 |
| Phosphorus | 1.26 |
| Nickel | 32.34 |
| Iron | .24 |
| Carbon | .15 |
| Powdered dry flux | 3.60 |

The last mentioned formula, when heated to a temperature of 1185° F. and molded under a pressure of approximately 60,000 pounds per square inch, produces a matrix having a hardness of 68 to 70 on a Rockwell "B" scale. In the last mentioned formula the powdered dry flux may, if desired, be tetraborate.

It is contemplated that when the tool is used to dress and true a rough or coarse grinding wheel the matrix will be harder than when the tool is used to dress and true a less rough or coarse wheel.

The herein described diamond dressing tool effectively and efficiently fulfills its intended purpose and this, as previously described, is directly attributable to the fact that the naturally shaped diamonds fall within a particular size range and are in a particular amount and the matrix in which the diamonds are embedded or mounted falls within a particular range of hardness. In the present tool there is no resetting of diamonds inasmuch as each diamond is held in place until it is worn away to a point well past its girdle at which time it is released from the matrix and replaced by an adjacent diamond in the next following row of diamonds. Because succeeding layers of diamonds are worn away and there are always exposed diamonds in the dressing surface the tool as a whole stays sharp until the cutting part has been completely worn away in connection with proper use of the tool. Because of the three essential factors upon which the tool is predicated the tool is capable of quick traversing without the possibility or likelihood of glazing, burning or "closing up" of the periphery of the grinding wheel being dressed. Due to the particular size of the diamonds and the amount of diamonds in the exposed or dressing surface of the cutting part the tool as a whole is capable of dressing and truing at a rapid rate.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a tool designed to dress and true a standard or conventional grinding wheel for precision grinding and comprising a supporting member and a block-like cutting part mounted on the member, having a substantially flat dressing surface for tangential contact with the wheel, and consisting of a solid matrix formed of heat-joined comminuted metal and having a hardness of no lower than 65 on a Rockwell "B" scale and no more than 62 on a Rockwell "C" scale, and a plurality of naturally formed solid diamonds distributed heterogeneously but uniformly throughout the entire matrix, said diamonds being of no greater size than 70 per carat and no smaller size than 230 per carat and being distributed throughout the matrix so that there are fewer of them when their size is large and more of them when their size is small and also so that when all of the diamonds are 70 per carat there are no less than 24 per square inch in the dressing surface and when all of the diamonds are 230 per carat there are no more than 300 per square inch in said dressing surface.

2. As a new article of manufacture, a tool designed to dress and true a conventional or standard grinding wheel for precision grinding and comprising a T-shaped shank formed of metal, consisting of an elongated piece and a crosspiece at one end of the elongated piece, having in the outer portion of its crosspiece an elongated longitudinally extending socket, and adapted in connection with use to be held in a position wherein the crosspiece is in parallel relation with the axis of the grinding wheel, and a block-like cutting part mounted in, and corresponding in shape to, the socket, having at the outer portion thereof a substantially flat dressing surface for tangential contact with the wheel, and consisting of a solid matrix formed of heat-joined comminuted metal and having a hardness of no lower than 65 on a Rockwell "B" scale and no more than 62 on a Rockwell "C" scale, and in addition a plurality of naturally formed solid diamonds distributed heterogeneously but uniformly throughout the entire matrix, said diamonds being of no greater size than 70 per carat and no smaller size than 230 per carat and being distributed throughout the matrix so that there are fewer of them when their size is large and more of them when their size is small and also so that when all of the diamonds are 70 per carat there are no less than 24 per square inch in the dressing surface and when all of the diamonds are 230 per carat there are no more than 300 per square inch in said dressing surface.

LEOPOLD H. METZGER.

References Cited in the file of this patent

UNITED STATES PATENTS

| Number | Name | Date |
|---|---|---|
| Re. 21,165 | Pyl | July 25, 1939 |
| 1,848,182 | Koebel | Mar. 8, 1932 |
| 1,941,283 | Taylor | Dec. 26, 1933 |
| 2,141,202 | Wallace | Dec. 27, 1938 |
| 2,254,392 | Petrie | Sept. 2, 1941 |
| 2,404,184 | Ludel | July 16, 1946 |
| 2,435,916 | Windsor | Feb. 10, 1948 |
| 2,545,676 | Small | Mar. 20, 1951 |